United States Patent [19]

Haataja

[11] 4,384,019

[45] May 17, 1983

[54] MOLDED WOOD PARTICLE PRODUCTS INCLUDING INTEGRALLY JOINED INTERSECTING MEMBERS

[75] Inventor: Bruce A. Haataja, Lake Linden, Mich.

[73] Assignee: Board of Control of Michigan Technological University, Houghton, Mich.

[21] Appl. No.: 296,781

[22] Filed: Aug. 27, 1981

[51] Int. Cl.[3] .......................... A47C 5/14; B32B 5/12

[52] U.S. Cl. .................................... 428/106; 297/445; 428/326; 428/542.8

[58] Field of Search ............ 428/106, 323, 326, 542.8; 297/445; 264/112

[56] References Cited

U.S. PATENT DOCUMENTS

| | | | |
|---|---|---|---|
| 3,238,281 | 3/1966 | Kato | 264/109 |
| 3,415,708 | 12/1968 | Rondum | 428/326 X |
| 3,441,959 | 4/1969 | Sears et al. | 428/326 X |
| 3,447,996 | 6/1969 | Himmelheber et al. | 428/326 X |
| 3,790,421 | 2/1974 | Habgood, Jr. | 428/326 X |
| 3,857,752 | 12/1974 | McCoy | 428/116 X |
| 3,916,059 | 10/1975 | Molloy et al. | 428/326 X |
| 3,956,541 | 5/1976 | Pringle | 428/326 X |
| 3,956,555 | 5/1976 | McKean | 428/326 X |
| 4,097,648 | 6/1978 | Pringle | 428/326 |
| 4,131,705 | 12/1978 | Kubinsky | 428/326 X |
| 4,246,310 | 1/1981 | Hunt et al. | 428/106 |

*Primary Examiner*—Henry F. Epstein

[57] ABSTRACT

A molded product formed from wood flakes intermixed with a binder and a first elongated member formed from elongated wood flakes compressed and bonded together with a binder, the wood flakes having a grain direction extending generally parallel to the longitudinal axis of the flakes and the flakes being generally oriented in alignment with the longitudinal axis of the first elongated member. A second elongated member intersects the first elongated member and is integrally joined to it. The second elongated member is also formed from elongated wood flakes compressed and bonded together with a binder, the wood flakes being generally oriented in alignment with the longitudinal axis of the second elongated member. The wood flakes of the second elongated member intersect and are interleaved with the wood flakes of the first elongated member to thereby form an integral molded joint between the first elongated member and the second elongated member.

4 Claims, 3 Drawing Figures

MOLDED WOOD PARTICLE PRODUCTS INCLUDING INTEGRALLY JOINED INTERSECTING MEMBERS

FIELD OF THE INVENTION

The invention relates to the construction of products from compressed wood particles joined by a binder and to methods for making such products. The invention also relates to the manufacture of wood products such as furniture.

BACKGROUND PRIOR ART

In the manufacture of conventional wood structures such as furniture wherein the furniture includes a frame having at least one elongated member joined to a transverse elongated member, a common method of joinder requires forming a bore in one of the elongated members and inserting the end of the other member into the bore. The joint is secured by an adhesive. If the two intersecting members are of similar cross-sectional sizes, the end of the second member must be reduced in diameter such that it can be inserted into the bore in the first elongated member. Since the first member includes a bore at the point of juncture and the second member is reduced in diameter, each of the members is reduced in strength in the area of the joint.

In other bodies of prior art, the prior art structures teach the construction of elongated panels and boards from wood chips or wood particles mixed with a binder and compressed together. Such prior art, however, is generally limited to the construction of discrete linear members such as panels or boards. For reference to some of the prior art teachings illustrating the construction of boards or panels from wood chips, attention is directed to the Himmelheber et al. U.S. Pat. No. 3,447,996, the Rondum U.S. Pat. No. 3,415,708, the Habgood U.S. Pat. No. 3,790,421; and the Sears et al. U.S. Pat. No. 3,441,959.

Attention is also directed to the McKean U.S. Pat. No. 3,956,555, the Hunt et al. U.S. Pat. No. 4,246,310; and the Pringle U.S. Pat. No. 4,097,648.

Attention is also directed to the Pringle U.S. Pat. No. 3,956,541 and the McCoy U.S. Pat. No. 3,857,752.

SUMMARY OF THE INVENTION

The present invention provides an improved means for constructing structural members from composite wood particle mixtures and particularly those structural members, such as furniture components, which have in the past been comprised of assembled pieces of wood. The invention includes the construction of such structural members from elongated wood flakes and wherein intersecting elongated members forming the structure are formed unitarily and with the wood flakes forming one elongated member being interleaved with the wood flakes forming the intersecting elongated member, such intersection of the elongated wood flakes forming a unitary joint having a strength which is greater than that of conventional joints used in the construction of furniture and the like.

More particularly, the invention includes a molded unitary product comprised of wood flakes intermixed with a binder, the molded product comprising a first elongated member including elongated wood flakes compressed and bonded together with a binder. The wood flakes have a grain direction extending generally parallel to their longitudinal axes, and the wood flakes are oriented in alignment with the longitudinal axis of the first elongated member. The molded product also includes a second elongated member intersecting the first elongated member and being integrally joined to the first elongated member, the second elongated member also including elongated wood flakes compressed and bonded together with a binder. The wood flakes forming the second elongated member are oriented generally in alignment with the longitudinal axis of the second elongated member, and the wood flakes of the second elongated member intersect and are interleaved with the wood flakes of the first elongated member to thereby form an integral molded joint between the first elongated member and the second elongated member.

The invention also includes a method for forming a structural member comprised of elongated wood flakes bound together with a binder and including a first elongated structural member and a second elongated structural member integrally joined together at a point of connection and at an obtuse angle. The method includes the steps of providing a first mold member having a first elongated cavity and a second elongated cavity intersecting the first elongated cavity at an intersecting cavity portion, the first elongated cavity being at an obtuse angle to the second elongated cavity. Elongated wood flakes intermixed with a binder are deposited in the first elongated cavity with a majority of the wood flakes being oriented generally parallel with the longitudinal axis of the first elongated cavity and elongated wood flakes intermixed with a binder are also deposited in the second elongated cavity with a majority of the wood flakes in the second elongated cavity being oriented generally parallel to the longitudinal axis of the second elongated cavity. The wood flakes in the first cavity portion are interleaved with the wood flakes in the second cavity portion.

The wood flakes in the mold are then compressed to form a composite product including first and second structural members integrally joined together.

Various other features of the invention will be apparent from the following description of a preferred embodiment, from the claims, and from the drawings.

Figure 1:
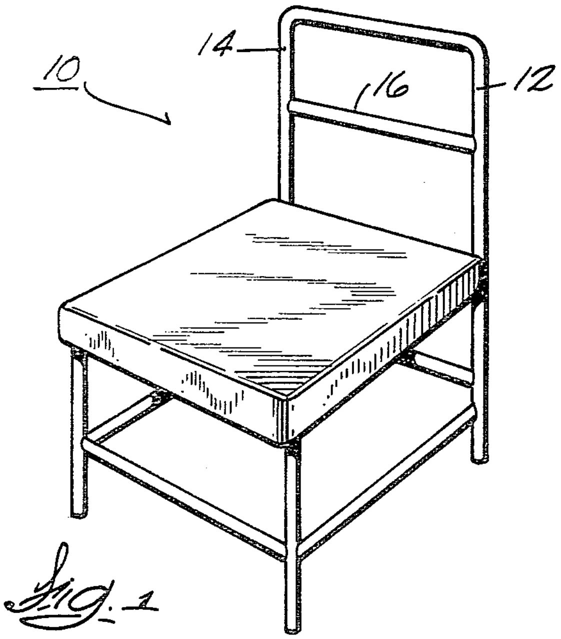
FIG. 1 is a perspective view of a structure embodying the present invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 2:
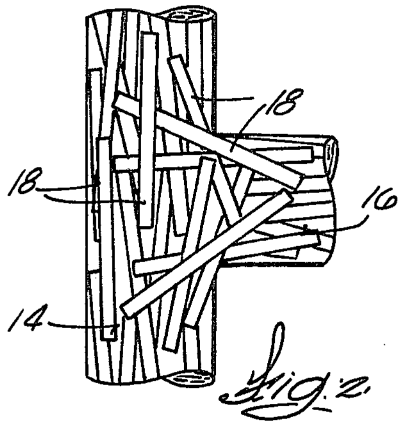
FIG. 2 is an enlarged elevation view of a portion of the structure shown in FIG. 1.

Illustrated in FIG. 1 is a chair 10 embodying the present invention, at least a portion of the chair, such as the chair back 12, being constructed as a molded unitary compressed wood product embodying the invention and being comprised of elongated wood flakes intermixed with a binder and compressed so as to form a high density product. More specifically, the chair back 12 illustrated in FIG. 1 includes a plurality of vertically extending elongated members 14 comprised of compressed wood flakes and a plurality of horizontal elongated transverse members 16 also comprised of compressed wood flakes, the elongated transverse members 16 intersecting the elongated members 14 and being integrally joined thereto. The elongated members 14 and 16 are each comprised of wood flakes 18 (FIG. 2) joined together by a binder and compressed so as to form a densified and integral structural member and with the elongated members being integrally joined together.

Figure 3:
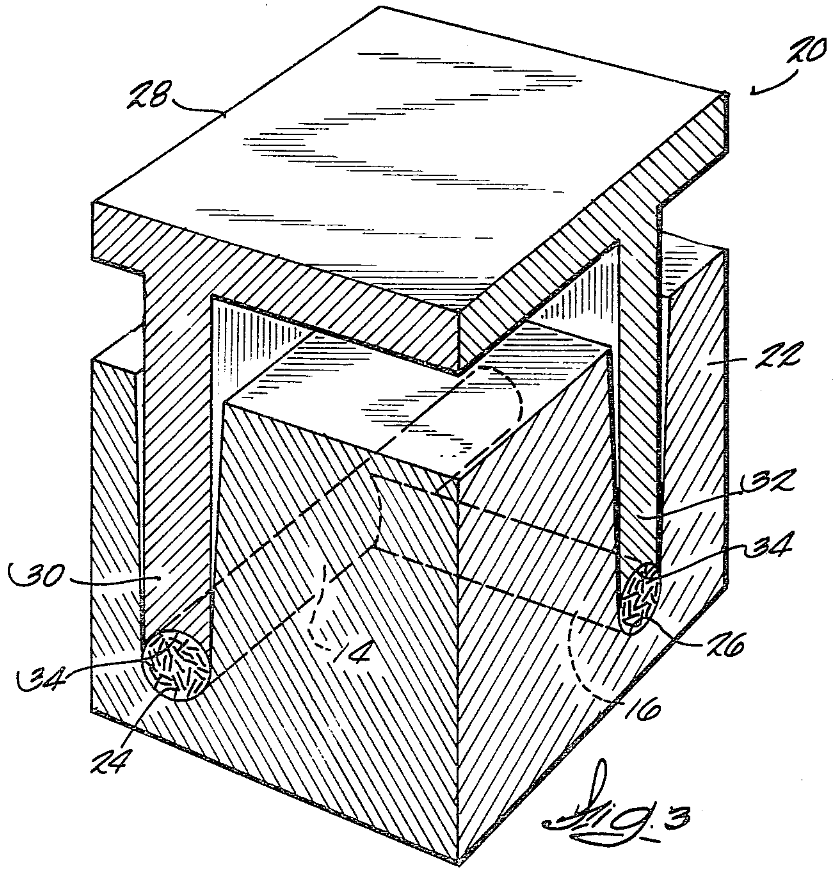
FIG. 3 is a perspective view of a die assembly for use in forming the structural members illustrated in FIG. 1.

FIG. 3 illustrates a die assembly arrangement 20 for use in making a compressed wood flake product as illustrated in FIG. 1. Generally, the die assembly 20 comprises a female die 22 having a first elongated die cavity portion 24 wherein the elongated member 14 can be formed and an intersecting die cavity portion 26 wherein the elongated members 16 can be formed. The die assembly 20 also includes a male die member 28 including integrally joined forming members 30 and 32 which are complementary to the female die cavity portions 24 and 26, respectively, and which are adapted to be inserted into those die cavity portions to compress wood flakes therein to form the product illustrated in FIG. 1. Conventional means not shown are provided for generating a substantial downward force on the press member 28 to compress wood flakes contained in the die cavity. It should be noted that the forming members 30 and 32 include elongated concave surfaces 34 on their lower ends adapted to form an upper portion of the molded product, and the die cavity portions 24 and 26 include opposed complementary elongated concave forming surfaces.

In operation of the die assembly illustrated in FIG. 3 the forming member 28 is moved upwardly out of the die cavity and wood flakes are deposited in the die cavity portions 24 and 26. It will be noted that the die cavity portions 24 and 26 are several times deeper than they are wide, and a large quantity of wood flakes can be deposited in the die cavity portions in a loosely felted relation. In the illustrated arrangement the die assembly is adapted to form a product which has a cross sectional thickness of approximately 1 inch. In such cases the die cavity has a depth, in most cases, greater than 5 inches in order that a substantial quantity of wood flakes may be deposited in the die cavity in loosely felted relation and in sufficient quantities that when the wood flakes are subjected to large compressive forces they will produce a very dense composite product.

In the illustrated arrangement wherein the elongated members 14 and 16 forming the composite product have a cross sectional thickness of approximately an inch it has been found to be desirable that the elongated flakes 18 (FIG. 2) for use in forming the product have a length of approximately 2 inches and a width of less than $\frac{1}{2}$ inches and with a substantial majority of the wood flakes having a width of between $\frac{1}{8}$ and $\frac{3}{8}$ inches. It has been found that using wood flakes having such lengths and widths facilitates the deposition of the flakes into the die cavity portions 24 and 26. Additionally, by providing wood flakes 18 which have a length greater than the width of the die cavity portions, the flakes are self aligning as they are deposited in the cavity portions, i.e. a substantial majority of the wood flakes are positioned in general alignment with the longitudinal axes of the respective die cavity portions. While wood flakes having a length greater than 2 inches can be employed, wood flakes of these increased lengths are more difficult to deposit in the die cavity and present handling problems.

As the wood flakes 18 are deposited in the die cavity portions 24 and 26, it is desirable that the elongated cavity portions be filled with wood flakes simultaneously such that those flakes in the area of the transverse cavity portion 24 will project into the elongated cavity 26 and be interleaved with the wood flakes in the elongated cavity portion 26 and such that the wood flakes 18 forming the transverse elongated members 16 will form integral bonds in an interleaved relationship with the wood flakes 18 forming the elongated member 14.

The wood flakes 18 forming the elongated members 14 and 16 are mixed with a binder in the amounts of 2 to about 15 weight percent of binder and optionally of about 0.5 to 2 weight percent, based on the dry weight of the wood flakes, of a wax to provide waterproof protection. In a preferred form of the invention and wood flakes will have a thickness of approximately 0.02 inches, though the thickness of the wood flakes vary from approximately 0.005 to 0.04 inches. It is preferred that a substantial majority of the wood flakes, however, have a thickness of approximately 0.02 inches in order to produce a product having maximum strength. The employment of wood flakes having increased thicknesses produces a product with decreased strength. If the wood flakes are too thick, the wood flakes will not be pressed together completely and this results in incomplete binding of the flakes together and strength is decreased. If on the other hand, the flakes are thinner than 0.02 inches, a large amount of binder is required to coat the surfaces of the wood flakes, and the cost of the composite wood flake product is increased.

While in the illustrated arrangement the molded product includes elongated members joined together so as to form a generally planar structure, in other arrangements and with the employment of other die assemblies, products having various constructions can be formed and including non-planar configurations. For example, while in the illustrated construction the product described comprises a planar chair back, with suitable press apparatus, the chair back and at least a portion of the frame for the chair seat, could be formed in one piece. Additionally, while FIG. 1 shows a chair embodying the invention, the invention could be employed in the construction of a variety of products otherwise produced from fabricated parts. By way of illustration, while conventional sofas include a frame constructed of wood, such frames could be manufactured using the method and apparatus referred to above. It should also be understood that whereas the elongated members shown above are linear, in other arrangements the members integrally joined together could be curved and have a variety of configurations.

Various features of the invention are set forth in the following claims.

I claim:

1. A molded unitary product comprised of wood flakes intermixed with a binder, the product comprising
   a first discrete elongated member having a first longitudinal axis, said first elongated member including elongated wood flakes compressed and bonded together with a binder, said wood flakes having a grain direction extending generally parallel to the longitudinal axis thereof and said wood flakes being oriented generally in alignment with the first longitudinal axis of said first elongated member, and a second discrete elongated member having a second longitudinal axis, the longitudinal axis of said first elongated member being transverse to said second longitudinal axis, and a portion of said second elongated member intersecting a portion of said first elongated member, and said portion of said second elongated member being integrally joined to said portion of said first elongated member, said second elongated member including elongated wood flakes compressed and bonded together with a binder, said wood flakes having a grain direction extending generally parallel to said second longitudinal axis thereof and being oriented generally in alignment with said second longitudinal axis, and said wood flakes forming said portion of said second elongated member intersecting and being interleaved with said wood flakes of said portion of said first elongated member to form an integral molded joint between said first elongated member and said second elongated member.

2. A molded unitary product as set forth in claim 1 wherein said first elongated member comprises a first elongated structural member of an article of furniture and wherein said second elongated member comprises a second structural member of an article of furniture.

3. A molded unitary product as set forth in claim 1 wherein said elongated wood flakes have an average length of about 2 inches, an average width of between $\frac{1}{8}$ and $\frac{3}{8}$ inches, and an average thickness of about 0.005 to about 0.04 inches.

4. A molded unitary product as set forth in claim 2 wherein said elongated wood flakes have an average length of about 2 inches, an average width of between $\frac{1}{8}$ and $\frac{3}{8}$ inches, and an average thickness of about 0.005 to about 0.04 inches.

* * * * *